United States Patent
Tan et al.

(10) Patent No.: US 7,853,204 B2
(45) Date of Patent: Dec. 14, 2010

(54) METHOD AND SYSTEM FOR IDENTIFYING A RELAY MOBILE STATION IN A WIRELESS COMMUNICATION NETWORK

(75) Inventors: Poy Boon Tan, Singapore (SG); Marwaha Shivanajay, Singapore (SG)

(73) Assignee: Panasonic Corporation, Kadoma-shi (JP)

( * ) Notice: Subject to any disclaimer, the term of this patent is extended or adjusted under 35 U.S.C. 154(b) by 210 days.

(21) Appl. No.: 11/577,601

(22) PCT Filed: Oct. 21, 2004

(86) PCT No.: PCT/SG2004/000347

§ 371 (c)(1),
(2), (4) Date: Jan. 23, 2008

(87) PCT Pub. No.: WO2006/043902

PCT Pub. Date: Apr. 27, 2006

(65) Prior Publication Data

US 2008/0188177 A1    Aug. 7, 2008

(51) Int. Cl.
     *H04B 7/185*   (2006.01)
(52) U.S. Cl. .................. 455/13.1; 455/11.1; 455/16
(58) Field of Classification Search ............... 455/3.02, 455/427, 7, 11.1, 12.1, 13.1, 13.2, 16; 370/226, 370/293, 246, 274, 279, 315, 316, 492, 501
    See application file for complete search history.

(56) References Cited

U.S. PATENT DOCUMENTS

| | | | |
|---|---|---|---|
| 6,169,880 B1 * | 1/2001 | La Fratta et al. | 455/11.1 |
| 6,731,905 B2 * | 5/2004 | Ogino et al. | 455/11.1 |
| 6,735,417 B2 * | 5/2004 | Fonseca et al. | 455/11.1 |
| 6,832,091 B1 * | 12/2004 | Sugaya | 455/450 |
| 6,862,430 B1 * | 3/2005 | Duffy et al. | 455/11.1 |
| 6,961,367 B2 * | 11/2005 | Simic et al. | 375/214 |
| 7,283,786 B2 * | 10/2007 | Shimada et al. | 455/9 |
| 7,349,360 B2 * | 3/2008 | Gutierrez et al. | 370/315 |
| 7,400,856 B2 * | 7/2008 | Sartori et al. | 455/7 |
| 7,444,152 B2 * | 10/2008 | Wu et al. | 455/445 |
| 7,676,195 B2 * | 3/2010 | Ratiu et al. | 455/13.1 |
| 2003/0103492 A1 * | 6/2003 | Tanimoto | 370/351 |
| 2004/0003778 A1 | 1/2004 | Hayashi | |
| 2008/0095095 A1 * | 4/2008 | Adachi et al. | 370/315 |

FOREIGN PATENT DOCUMENTS

| | | |
|---|---|---|
| WO | 00 54539 | 9/2000 |
| WO | 02 080608 | 10/2002 |
| WO | 03 055246 | 7/2003 |

OTHER PUBLICATIONS

V. Sreng, et al, "Relayer Selection Strategies in Cellular Networks with Peer-to-Peer Relaying", IEEE, 2003, pp. 1949-1953.

* cited by examiner

*Primary Examiner*—Duc Nguyen
*Assistant Examiner*—Dominic E Rego
(74) *Attorney, Agent, or Firm*—Oblon, Spivak, McClelland, Maier & Neustadt, L.L.P.

(57) ABSTRACT

A method of identifying a relay mobile station in a wireless communication network. The method includes applying an elimination process to candidate relay mobile stations, calculating a Figure of Merit (FOM) for each remaining candidate relay mobile station based on one or more parameters, and selecting the relay mobile station based on the calculated FoMs.

20 Claims, 6 Drawing Sheets

METHOD AND SYSTEM FOR IDENTIFYING A RELAY MOBILE STATION IN A WIRELESS COMMUNICATION NETWORK

FIELD OF INVENTION

The present invention relates broadly to a method and system for identifying a relay mobile station in a wireless communication network.

BACKGROUND

Relaying data packets over wireless channel within a multi-station cellular communication network, may be implemented between mobile stations (MSs) by utilizing multi-hop relaying. The cellular communication network typically employs Time Division Duplexing (TDD), and uses Code Division Multiple Access (CDMA) scheme for transmission and reception of control and user data over the air-interface.

Like user terminals, relays are not connected to the wire line network through a back haul connection, but rely on the wireless link with a base station BS. Relaying MSs or Mobile Station Relay (MSR) called hereafter, forward data received from the BS intended for another MS. MSR should be chosen such that its own traffic is not adversely impacted. Moreover, for efficient usage of network resources and load balancing, the MSR has to be selected carefully.

Using relays can help improve the performance for the users especially those at the edge of the cell or in shadowed areas in a cell. Use of relays in wireless networks also has many other advantages such as increased data rates, reduced interference due to reduction in transmission power, increased spatial reuse due to simultaneous transmission from both the relay and the BS.

The conventional relaying operation in cellular networks is performed via repeaters, which are used to extend the coverage to dead spots. Wireless repeaters provide e.g. radio frequency (RF) coverage to areas in a cell which either lack signal or, lack the required signal strength for adequate mobile phone performance. Insufficient coverage may occur and can include such areas as office buildings, parking garages, shopping malls, large convention halls, underground tunnels and freeways and residential homes Installing an active repeater system can solve the weak coverage problem. Repeater systems provide an effective solution by redirecting, filtering and amplifying the available signal at the donor antenna, into the weak coverage area, through a properly selected interior coverage antenna. This form of relaying is carried out in analog form, where the multi-hop signals are amplified and forwarded to the region to be covered.

Until now only bi-directional amplifiers have been used in second-generation cellular communication systems and will be introduced in third-generation cellular communication systems also. These analog amplifier type repeaters also increase the noise level (by amplifying the noise signals as well), which has limited their application in cellular communication systems.

Relaying can be performed in digital form also, in which case the relayer or repeater receives the multi-hop signal, demodulates and decodes it, and then re-encodes and re-modulates the signal before re-transmitting it to the relayed node or a Mobile Station Target (MST). The advantage of using digital relaying is that it is free of noise and interference.

Multi-hop wireless networking has been traditionally studied in the contest of ad hoc and peer-to-peer networks. While the goal of ad hoc networks is the ability to function without any infrastructure, the goal in the multi-hop wireless cellular communication networks is the almost ubiquitous provision of high data rate and coverage extension for cellular mobile communication systems.

Whenever relaying is performed, a relay node has to be selected which is required to receive the multi-hop signal from the BS, demodulate and decode that signal and re-modulate and re-encode the multi-hop signal before re-transmitting it to the relayed node. In the other direction, the selected relay node receives the multi-hop signal from the relayed node, demodulates and decodes that signal and re-modulates and re-encodes the multi-hop signal before re-transmitting it to the BS.

Routing is very critical and challenging in ad hoc networks since there is no central identity and the topology of ad hoc networks is very dynamic. However, decisions on routing or relay node selection in multi-hop augmented cellular communication systems can be facilitated by utilizing the centralized information available at the BS. Nevertheless, relay node selection is still quite critical in cellular communication systems, as the relay node selection strategy must meet various constraints such as various quality of service constraints, performance constraints and resource constraints.

Relay node selection using single criterion only may not select a good relay node in practical situations in which system objectives are multi-faceted. Multiple criteria are often needed in route selection since a single criterion cannot readily satisfy system performance metrics involving different applications. For example a delay sensitive application such as voice and video require high bandwidth whereas loss sensitive application such as Short Message Service (SMS) or Multimedia Message Service (MMS) require guaranteed delivery of data. Thus the criterion for relay route selection is different for different classes of applications. Furthermore, a single criterion based relay node selection scheme can severely compromise the network performance on the overlooked criterion. For example, a relay node selection scheme considering only path loss or physical distance between the intermediate hops and ignoring the remaining battery power at the relay node can lead to the rapid depletion of battery life of a nearby relay node.

Methods to select a relay node in devices having two air-interfaces which are cellular and ad-hoc respectively have been proposed, e.g. in US Patent Appl. No. US20040033778, B. Fonseca, J. D. Bonta, and G. Calcev. In such implementations, users access the cellular infrastructure through ad-hoc network capability whenever they cannot access the cellular network directly, or when they find it more advantageous to do so. The ad-hoc air-interface may for example be implemented utilising the BLUETOOTH standard. In such a method, the responsibility associated with relay node selection and allocation of wireless resources is moved from the direct cellular network air-interface to the additional, ad-hoc air-interface. Therefore, such relay node selection method hinge on the mobile units being capable of dual wireless access technologies, that is to cellular (direct) services, and ad-hoc services or BLUETOOTH network also.

It is with the knowledge of the above mention concerns that the present invention has been made and is now reduce to practice.

SUMMARY

In accordance with a first aspect of the present invention there is provided a method of identifying a relay mobile station in a wireless communication network, the method comprising applying an elimination process to candidate relay mobile stations; and calculating a Figure of Merit (FoM) for each remaining candidate relay mobile station based on one or more parameters; and selecting the relay mobile station based on the calculated FoMs.

The method may comprise maintaining a table of the candidate relay mobile stations.

The table may comprise data on one or more of a group consisting of a code, a received signal strength (RSS), and the time of the last signal received from the candidate relay mobile station at the mobile station requesting a relay mobile station.

The elimination process may comprise one or more Boolean decisions of a group consisting of whether the candidate relay mobile station was already selected as a relay station for another requesting mobile station; whether the candidate relay mobile station was already configured as a mobile station requesting a relay mobile station, and whether an available code sequence can be allocated in a downlink time slot of the candidate relay mobile station.

The parameters may comprise one or more of a group consisting of a remaining battery power of the candidate relay mobile station, a signal-to-noise ratio of a signal received at the candidate relay mobile station from a base station, a signal to noise ration of a signal received from the candidate relay mobile station at a mobile station requesting the relay mobile station, a transmit power from the candidate relay mobile station to the base station, and a data rate allocated to the candidate relay mobile station for a downlink channel.

The method may further comprise maintaining a database containing data representing one or more of a group consisting of the remaining battery power of the candidate relay mobile station, the signal to noise ratio of a signal received at the candidate relay mobile station from a base station, the signal to noise ration of the signal received from the candidate relay mobile station at the mobile station requesting the relay mobile station, the transmit power from the candidate relay mobile station to the base station, and the data rate allocated to the candidate relay mobile station for the downlink channel.

Calculating the FoMs may comprise normalising respective values of the parameters for the remaining candidate relay mobile stations.

The method may further comprise the step of bypassing the calculating the FOMs when the number of remaining candidate relay mobile stations is one.

The method may further comprise sending a message to the selected relay mobile station, and selecting another remaining candidate relay mobile stations based on the FoMs having next highest FoM value, if the relay mobile station selected first, fails to send an acknowledgement message within a given time period or sends a rejection message.

In accordance with a second aspect of the present invention there is provided a system for identifying a relay mobile station in a wireless communication network, the system comprising means for applying an elimination processing to candidate relay mobile stations; and for calculating a Figure of Merit (FoM) for each remaining candidate relay mobile station based on one or more parameters; and a selection means for selecting the relay mobile station based on the calculated FoMs.

The system may comprise a database for maintaining a table of the candidate relay mobile stations.

The table may comprise data on one or more of a group consisting of a code, a received signal strength (RSS), and the time of the last signal received from the candidate relay mobile station by a mobile station requesting a relay mobile station.

The means for applying the elimination process may perform one or more Boolean decisions of a group consisting of whether the candidate relay mobile station was already selected as a relay station for another requesting mobile station; whether the candidate relay mobile station was already configured as a mobile station requesting a relay mobile station, and whether an available code sequence can be allocated in a downlink time slot of the candidate relay mobile station.

The parameters may comprise one or more of a group consisting of a remaining battery power of the candidate relay mobile station, a signal to noise ratio of a signal received at the candidate relay mobile station from a base station, a signal to noise ration of a signal received from the candidate relay mobile station at a mobile station requesting the relay mobile station, a transmit power from the candidate relay mobile station to the base station, and a data rate allocated to the candidate relay mobile station for a downlink channel.

The database may further contain data representing one or more of a group consisting of the remaining battery power of the candidate relay mobile station, the signal to noise ratio of a signal received at the candidate relay mobile station from a base station, the signal to noise ration of the signal received from the candidate relay mobile station at the mobile station requesting the relay mobile station, the transmit power from the candidate relay mobile station to the base station, and the data rate allocated to the candidate relay mobile station for the downlink channel.

The means for applying the elimination processing, in calculating the FoMs, may normalise respective values of the parameters for the remaining candidate relay mobile stations.

The means for applying the elimination processing may bypass the calculating the FoMs when the number of remaining candidate relay mobile stations is one.

The system may further comprise means for sending a message to the selected relay mobile station, and the means for selecting selects another one of the remaining candidate relay mobile stations based on the FoMs, if the selected relay mobile station, within a given time period, fails to send an acknowledgement message or sends a rejection message to a receiver means of the system.

The means for applying the elimination processing may be located at a base station of the wireless communications network.

The database may be located at the or a base station of the wireless communications network.

The wireless communications network may be based on TDD-CDMA multiple access technology.

BRIEF DESCRIPTION OF THE DRAWINGS

Embodiments of the invention will be better-understood and readily apparent to one of ordinary skill in the art from the following written description, by way of example only, and in conjunction with the drawings, in which.

DETAILED DESCRIPTION

Figure 1:
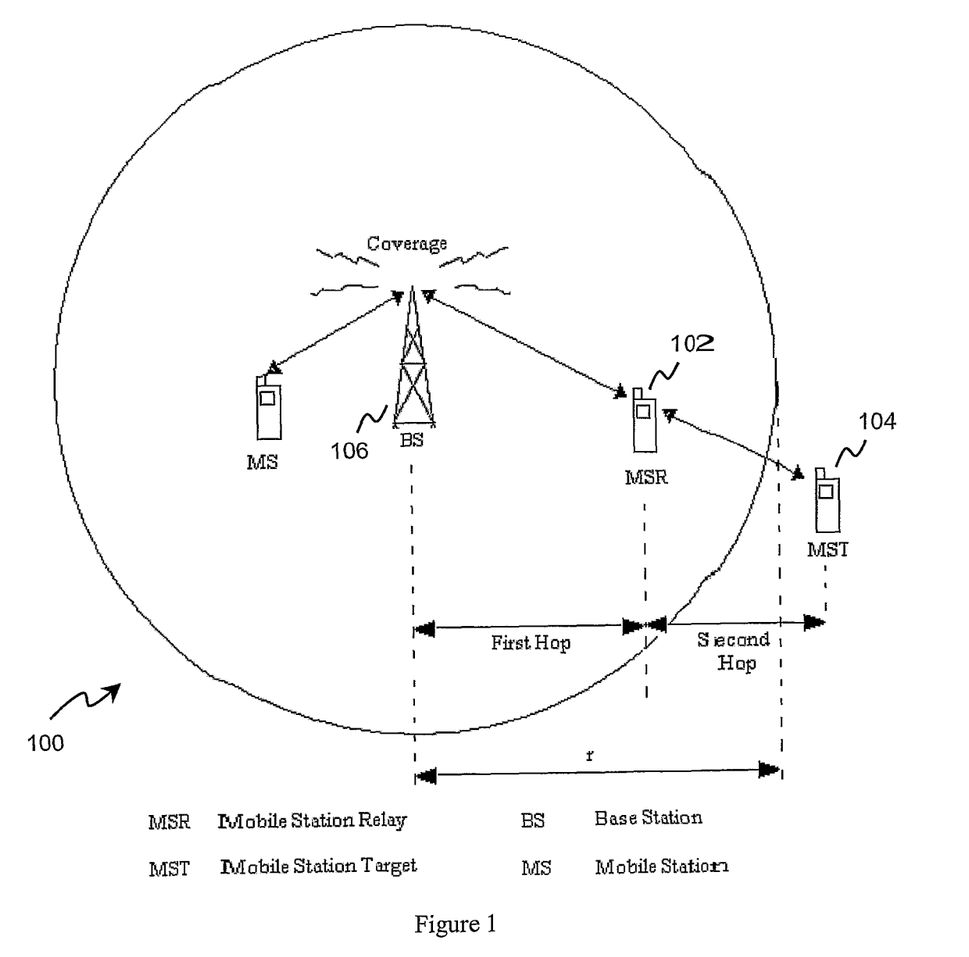
FIG. 1 shows a schematic layout drawing of a Multi-hop Cellular Network (MCN).

As shown in FIG. 1, the cellular network in an example embodiment is a TD-CDMA based network 100 and the aim of this embodiment is to find a relay node e.g. 102 for facilitating the switch from single-hop communication to multi-hop communication. This switch helps to reduce the number of dropped calls in a cell when the mobile stations e.g. 104 in the cell move to a shadowed region, or goes out of the cell boundary and are also not able to receive coverage from the neighboring cells. The example embodiment can help in virtually extending the range of the cell.

In the example embodiment, all MS e.g. 104 that are capable of multi-hop communication in the cell monitor the received signal strength (RSS) from neighboring MSs, and maintain this information in their internal memory as NB_TABLE. One instance of the NB_-TABLE is shown in Table 1 below.

TABLE 1

NB_TABLE maintained at each MS, containing information such as the code, RSS and the time of the last signal received from that neighboring node.

| Code | RSS | Time |
|------|-----|------|
| C1 | P1 | T1 |
| C2 | P2 | T2 |
| C3 | P3 | T3 |

These MSs e.g. 104 transmit control messages periodically to the BS 106. The control messages in the example embodiment comprise: (a) information depicted in the NB_TABLE, (b) the received signal strength from the BS as measured by the MS, (c) the remaining battery power of the MS itself, and (d) the nominal transmit power applied by the MS when transmitting to the BS. The BS 106 upon receiving this control message updates its global neighbor table GLOBAL_NB_TABLE according to the NB_TABLE information. Table 2 below illustrates the GLOBAL_NB_TABLE stored in the BS 106.

TABLE 2

GLOBAL_NB_TABLE maintained at base station

| Neighbor Node | N1 | N2 | N3 |
|---------------|-----|------|------|
| N1 |      | P1, 2 | P1, 3 |
| N2 | P2, 1 |      | P2, 3 |
| N3 | P3, 1 | P3, 2 |      |

The BS 106 also maintains information of all the MSs e.g. 104 in its coverage that are in the pool of candidate relaying MSs. From the control messages described in the last paragraph, BS 106 extracts information items (i), (ii) and (iii) below and builds a database called GLOBAL_NODE_DATABASE. Item (iv), the allocated data rate for each candidate relaying MS, can be determined internally within the BS 106 when physical resources are assigned to respective MS. Table 3 below shows the format of GLOBAL_NODE_DATABASE in the example embodiment.

SNR of the downlink signal received from the BS (SNR)
Uplink transmit power from the MS to the BS (TX)
Remaining battery power of the MS (B)
Rate allocated to the MS (R).

TABLE 3

GLOBAL_NODE_DATABASE maintained at base station

| Node | Battery Power | Tx Power | Rate Allocated | SNR |
|------|---------------|----------|----------------|------|
| N1 | B1 | TX1 | R1 | SNR1 |
| N2 | B2 | TX2 | R2 | SNR2 |
| N3 | B3 | TX3 | R3 | SNR3 |
| N4 | B4 | TX4 | R4 | SNR4 |

Figure 2:
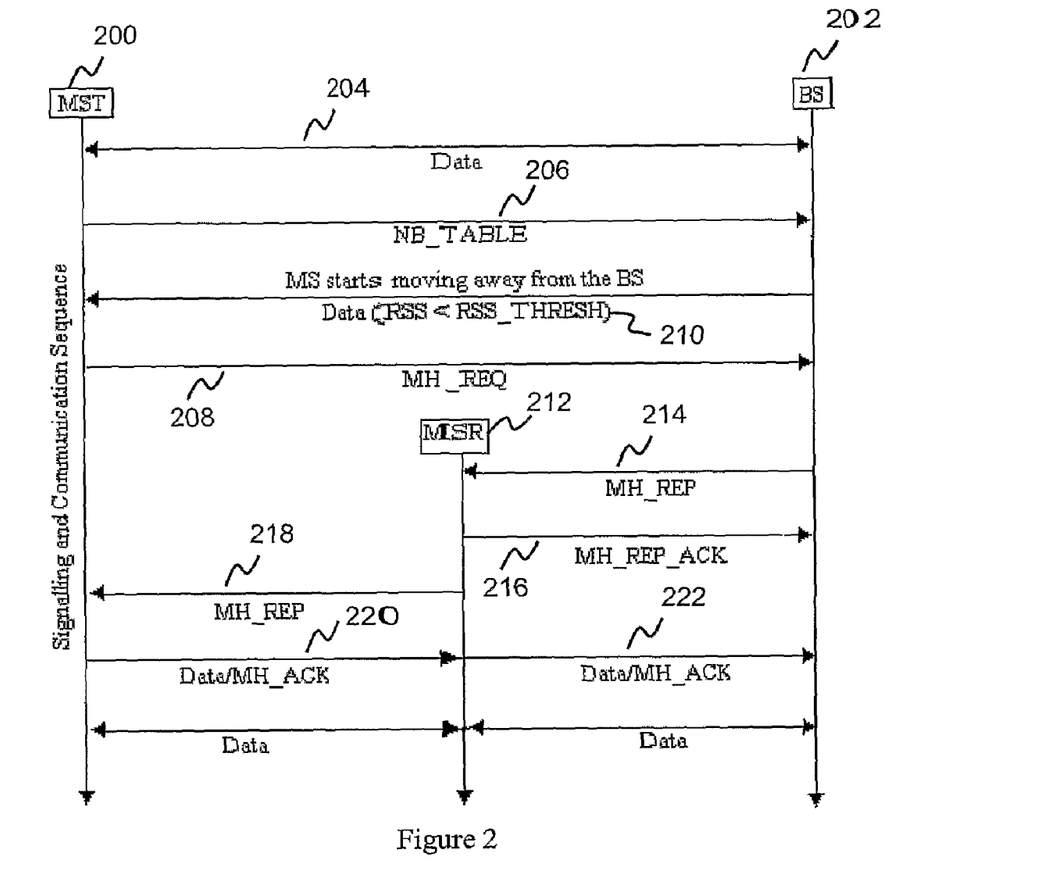
FIG. 2 shows a schematic signalling overview between the MSR and the BS during the course of the handover from SCN to MCN in accordance with an embodiment of the invention.

FIG. 2 illustrates an execution sequence involving a MS requesting for multi-hop communication (MST 200) and the serving BS 202 in the example embodiment. During active data exchange 204, the MS periodically transmits control messages containing NB_TABLE 206. The MS 200 sends a control message 208 (MH_REQ) to the serving BS 202 when the signal quality from the BS 202 to the MS 200 drops below a specified threshold 210 and the MS 200 cannot detect any signal from any other BSs (of the neighboring cells). The serving BS 202 then tries to allocate wireless resources and selects a relay node 212 (MSR), and transmits a multi-hop reply message 214 (MH_REPLY) to the MSR 212. After acknowledging the willingness to act as a relay node by sending MH_REPLY_ACK message 216 to serving BS 202, the MSR 212 then relays the MH_REPLY message 218 to the MST 200. The MST 200 establishes the wireless channels for serving MSR-MST communication hop. The sequence is completed when the MSR 212 receives the MH_ACK message 220 from the MST 200, and then successfully relays this message 222 to the serving BS 202.

Figure 3:
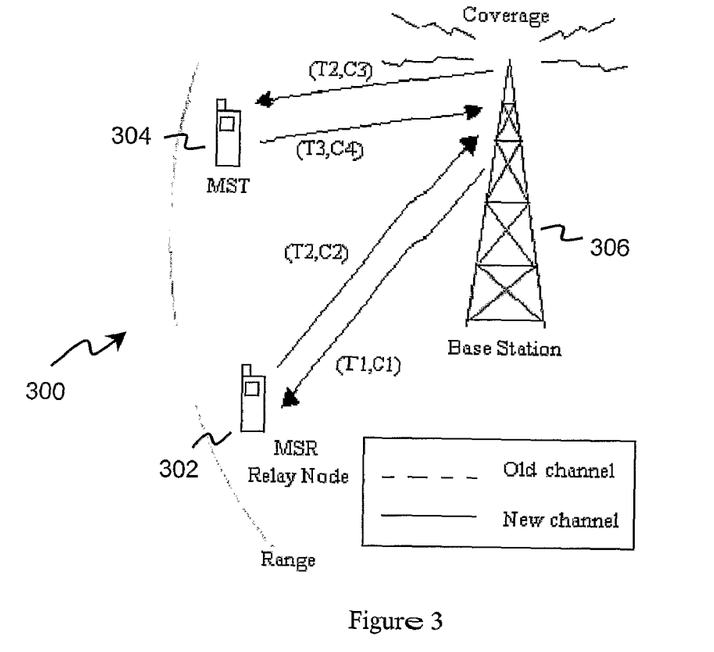
FIG. 3 shows resource allocation in single hop configuration in accordance with an embodiment of the invention.

In FIG. 3, Ty is used to denote the $y^{th}$ discrete time-slot and Cx to denote the $x^{th}$ code sequence as conventionally used in a communication system 300 based on TD-CDMA multiple access technology. (Ty, Cx) represents the resource pair utilized by a transmitter and a receiver entity in a TD-CDMA communication system 300. FIG. 3 shows the resource allocation before the multi-hop communication algorithm is executed, where (T1, C1) and (T2, C2) are the downlink and uplink resource pairs respectively allocated to MSR 302; and (T3, C4) and (T2, C3) are the uplink and downlink resource pairs respectively allocated to MST 304. Note that in FIG. 3, both MST 304 and MSR 302 are within the nominal coverage area of the BS 306, and communicate with the BS 306 directly over 1 hop.

Figure 4:
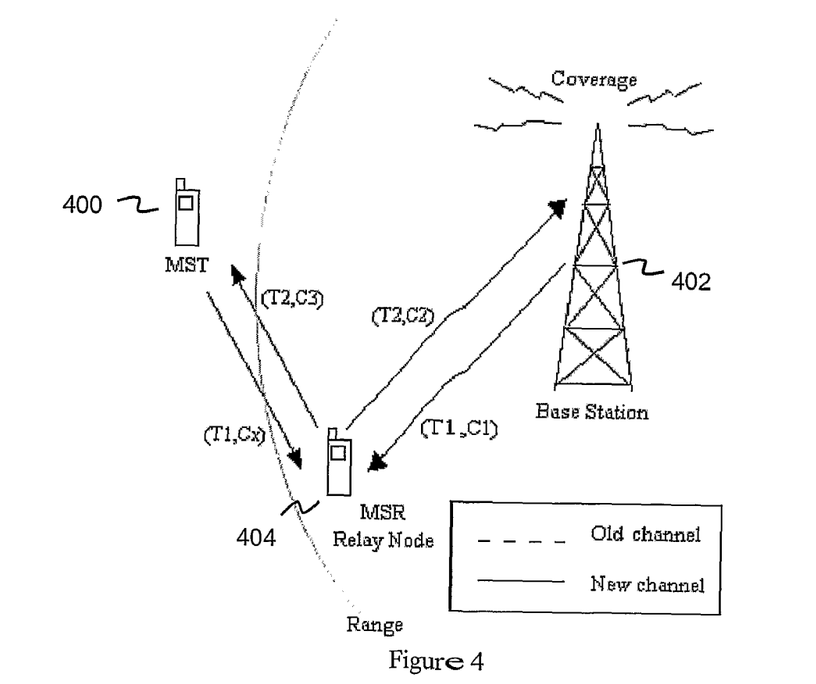
FIG. 4 shows resource allocation in multi-hop configuration in accordance with an embodiment of the invention.

In a representative case shown in FIG. 4, MST 400 can move out of the BS 402 coverage area leading to a switch to multi-hop configuration. When the switch to multi-hop configuration occurs only one of the two resource pairs is needed to be reconfigured i.e. the resource pair (T2, C3) in downlink direction for MST 400 is unchanged. Also for the relaying MSR 404, resource pairs (T2, C2) and (T1, C1) are kept undisturbed during this transition. Therefore, this mechanism requires minimal reconfiguration effort on the part of MST 400 and MSR 404, and also allows the system to seamlessly transit towards multi-hop configuration.

A relay node selection algorithm in the example embodiment utilizes the serving BS, which is the central entity within the multi-hop communication network.

Multiple criteria are utilized in the algorithm in the example embodiment.

Figure 5:
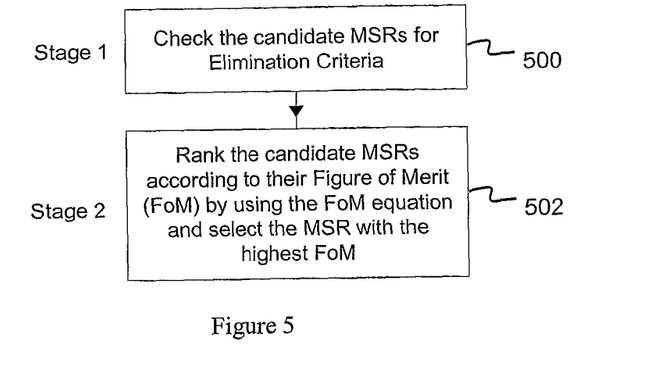
FIG. 5 shows a flow chart summarising a 2-stage processing according to an example embodiment of the invention.

The relay node selection algorithm is divided into two major stages in the example embodiment. FIG. 5 presents a high level overview of the algorithm. The first stage 500 involves the elimination of a subset of all candidate relay nodes by applying a number of elimination criteria (also referred to as Boolean criteria). Remaining candidate relay nodes, which are not eliminated in the first stage 500, are subjected to a ranking process in the second stage 502. Within the second stage 502, all candidate relay nodes are evaluated against a cost function. The BS selects the candidate node associated with the highest figure of merit as the MSR.

Figure 6:
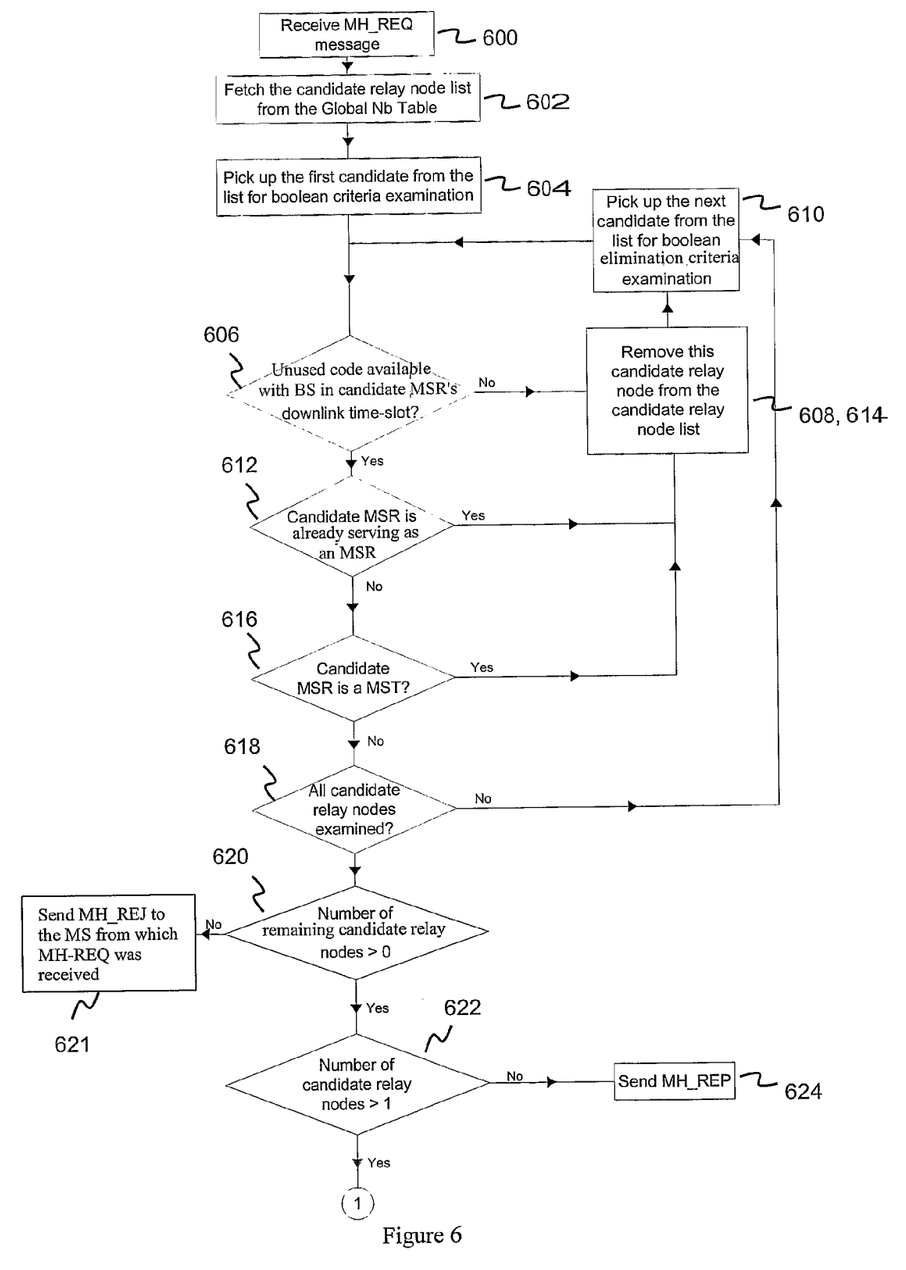
FIG. 6 illustrates elimination of the candidate relay nodes in accordance with an embodiment of the invention.

Details of the algorithm for elimination criteria applied in stage 1 in the example embodiment are shown in FIG. 6.

TABLE 4

Resource Allocation Table maintained at BS

| | | BS - MST Hop/BS - MSR Hop | | | | MST - MSR Hop | | | |
|---|---|---|---|---|---|---|---|---|---|
| MST | MSR | Uplink Code 1 | Uplink Time Slot 1 | Downlink Code 1 | Downlink Time Slot 1 | Uplink Code 2 | Uplink Time Slot 2 | Downlink Code 2 | Downlink Time Slot 2 |
| N1 | 0 | C1 | T1 | C4 | T4 | | | | |
| N2 | N1 | C1 | T1 | C4 | T4 | C2 | T4 | C5 | T1 |
| N3 | 0 | C3 | T3 | C6 | T6 | | | | |

At step 600, an MH_REQ message is received at the BS. The BS fetches the candidate relay node list for the MST from which the MH_REQ message was received, from the Global_NB_Table (see Table 2 above) at step 602. The BS then picks up the first candidate from the Global_NB_Table for Boolean criteria examination, at step 604.

At step 606, the BS checks for the availability of code in the downlink timeslot of the relay node, which has to be assigned to the MST for MST to MSR communication link. This code is denoted as Cx in FIG. 4, with the condition that $Cx \neq C1$. If an unused code is not available in $T_1$ time-slot then the candidate relay node is removed from the candidate list at step 608 and the next candidate MSR is picked up (step 610), and examined for the elimination criteria (step 606).

At step 612, the BS checks whether the candidate MSR is receiving service through 2-hop communication (i.e. is the candidate MSR acting as a MST) from the resource allocation table maintained in the BS. An instance of the resource allocation table is as shown in table 4. If the candidate MSR is a MST already, it is removed from the candidate list at step 614 and the next candidate MSR is picked up (step 610), and examined for the elimination criteria (step 606). This is done to keep the number of hops to two so as to reduce the control overhead required to maintain larger number of intermediate hops in a route, in the example embodiment. To illustrate further, consider nodes $N_2$ and $N_3$ in table 4. Node $N_2$ will be eliminated since it is using node $N_1$ as a relay node, while $N_3$ will survive this elimination step since it is not receiving service through any other nodes.

At step 616, the BS checks whether the candidate MSR has already been chosen by the BS to serve as an MSR for another MST from the resource allocation table, e.g. as shown in table 4. This is done to reduce congestion and data/packet loss probability at the relay node by restricting the number of MS, which a relay can service, to one only, in the example embodiment. To illustrate further, consider nodes $N_1$ and $N_3$ in table 4. Node $N_1$ will be eliminated since it already acts as a MSR for $N_2$, while $N_3$ will survive this elimination step.

The rationale of the example embodiment is to eliminate candidate MSRs that when chosen will violate design principles of the multi-hop cellular network. The said design may be used to limit the complexity and avoid biasing to specific candidate relay nodes during the multi-hop operation.

At step 618, the BS checks whether all candidate relay nodes have been examined. Once all candidate relay nodes have been examined, the BS checks at step 620, whether the number of remaining candidate relays is greater than 0. If it is not, the BS sends an MH_REJ message to the requesting MST, rejecting the multi-hub request, at step 621.

If the number of remaining candidate relay nodes is greater than 0, the BS checks, at step 622, whether the number of candidate relay nodes is greater than 1. If not, the BS send the MH_REP message, at step 624, to the requesting MST, as previously described with reference to FIG. 2.

Figure 7:
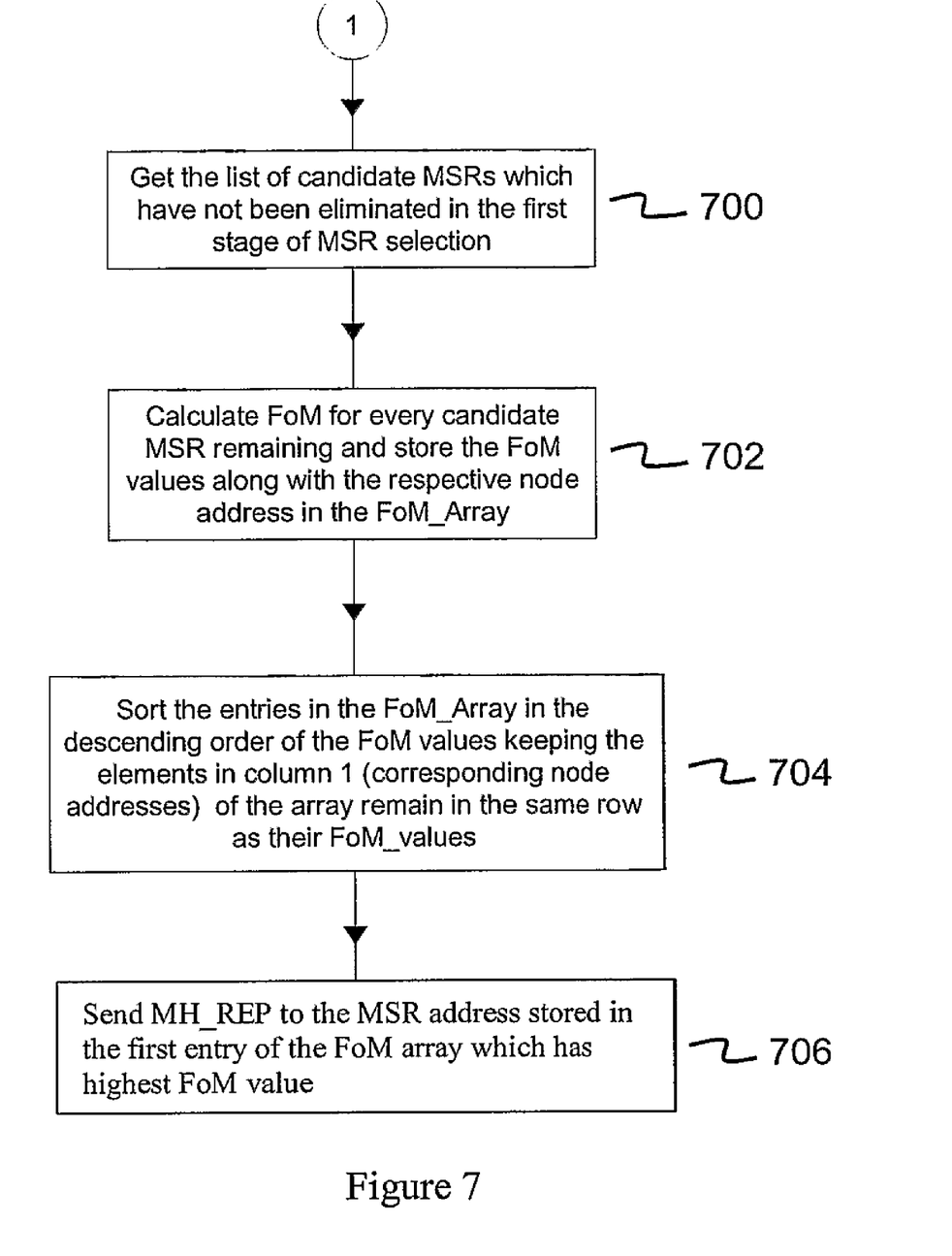
FIG. 7 illustrates ranking of the remaining candidate relay nodes in the final stage of selection of the candidate relay nodes and selecting the relay node with the maximum figure of merit in accordance with an embodiment of the invention.

If two or more candidate MSRs exist, then the BS executes the second stage of relay node selection algorithm in the example embodiment, as shown in FIG. 7. In the second stage of relay node selection the following parameters are combined together with the help of a figure of merit function by first normalizing parameters to compare the remaining candidate MSRs. In the example embodiment, the parameters include:

Remaining battery power of the MS

Signal to Noise Ratio of the signal from BS as measured at the candidate MSR

Signal to Noise Ratio of the signal(s) from candidate MSR as measured at the MST Maximum rate assigned to the candidate MSR Minimum transmit power at the candidate MSR At step 700, the list of candidate MSRs which have not been eliminated in the first stage of MSR selection are provided for the second stage processing.

Since transmit power for the relaying channel (from MSR to MST) is the same as the transmit power for the uplink channel (from MSR to BS) and assuming that the uplink transmit power to the BS is known to the BS beforehand (from the GLOBAL_NODE_DATABASE, e.g. as shown in table 3), the BS can use the same transmit power in the relay node selection process in order to reduce the total transmit power for multi-hop communication by selecting the relay node which would require less transmit power to send the signal without loss of data to the MST.

At step 702, the following function is used to calculate the figure of merit (FoM) to rank the remaining candidate MSRs in the example embodiment, at step 704. The parameters of the MSR used in the FoM equation are normalized into a unit-less form as shown in equation 1. The candidate MSR with the highest figure of merit is selected as the MSR.

$$FoM = \qquad (1)$$
$$w_1\left(\frac{RBP_{MSR} - \min\_RBP}{\max\_RBP - \min\_RBP}\right) + w_2\left(\frac{SNR_{MST} - \min\_SNR_{MST}}{\max\_SNR_{MST} - \min\_SNR_{MST}}\right) +$$
$$w_3\left(\frac{SNR_{MSR} - \min\_SNR_{MSR}}{\max\_SNR_{MSR} - \min\_SNR_{MSR}}\right) +$$
$$w_4\left(\frac{\max\_T - T_{MSR}}{\max\_T - \min\_T}\right) + w_5\left(\frac{RATE_{MSR} - \min\_RATE}{\max\_RATE - \min\_RATE}\right)$$

Where, $w_1, w_2, w_3, w_4, w_5$=User-defined weights attached to all the parameters, with the following constraints:

$$0 \leq w_1, w_2, w_3, w_4, w_5 \leq 1$$

$$\Sigma w_i = 1 \text{ (for } i=1 \text{ to 5)}$$

$RBP_{MSR}$=Remaining Battery Power of the candidate MSR (in mAh)

max_RBP=Maximum value of remaining battery power amongst all the candidate MSRs (in mAh)

min_RBP=Minimum value of remaining battery power amongst all the candidate MSRs (in mAh)

$SNR_{MSR}$=Signal to Noise ratio of the received signal from the BS as measured at the candidate MSR max_$SNR_{MSR}$=Maximum value of SNR of the received signal from the BS as measured at the candidate MSR amongst all the candidate MSRs min_$SNR_{MSR}$=Minimum value of SNR of the received signal from the BS as measured at the candidate MSR amongst all the candidate MSRs $SNR_{MST}$=Signal to Noise ratio of the received signal from the candidate MSR as measured at the MST max_$SNR_{MSR}$=Maximum value of SNR of the signal from the candidate MSR as measured at the MST amongst all candidate MSRs.

min_$SNR_{MST}$=Minimum value of SNR of the signal from the candidate MSR as measured at the MST amongst all candidate MSRs.

$T_{MSR}$=Transmit power from the candidate MSR to the BS (in mW)

min_T'=Minimum Transmit power amongst all candidate MSRs to the BS (in mW)

max_T'=Maximum Transmit power amongst all candidate MSRs to the BS (in mW)

$RATE_{MSR}$=Data rate allocated to the candidate MSR by the BS for the downlink channel. (in bps)

min_RATE=Minimum data rate allocated to the candidate MSR amongst all candidates MSRs. (in bps)

max_RATE=Maximum data rate allocated to the candidate MSR amongst all candidates MSRs. (in bps)

The sum of $w_1, w_2, w_3, w_4, w_5$ is kept constant to 1 so as to put a bound on the FoM value from 0-1.

As shown in FIG. 7, in the second stage of the relay node selection the BS calculates the FoM of all the remaining candidate relay nodes (step 702) and rank the resultant FoM entries in descending order (step 704) as a 2 dimensional array called FoM_Array, e.g. as shown in table 5. An MH-REP message is the send to the MSR address stored in the first entry of the FoM_Array, at step 706.

TABLE 5

FoM_Array stored in the internal memory of the BS containing the candidate MSR's ID and the corresponding FoM value arranged in the descending order where FoM__0 > FoM___1 > FoM__2 > FoM__3.

| MSR_ID | FoM |
|---|---|
| N0 | FoM_0 |
| N1 | FoM_1 |
| N2 | FoM_2 |
| N3 | FoM_3 |

Figure 8:
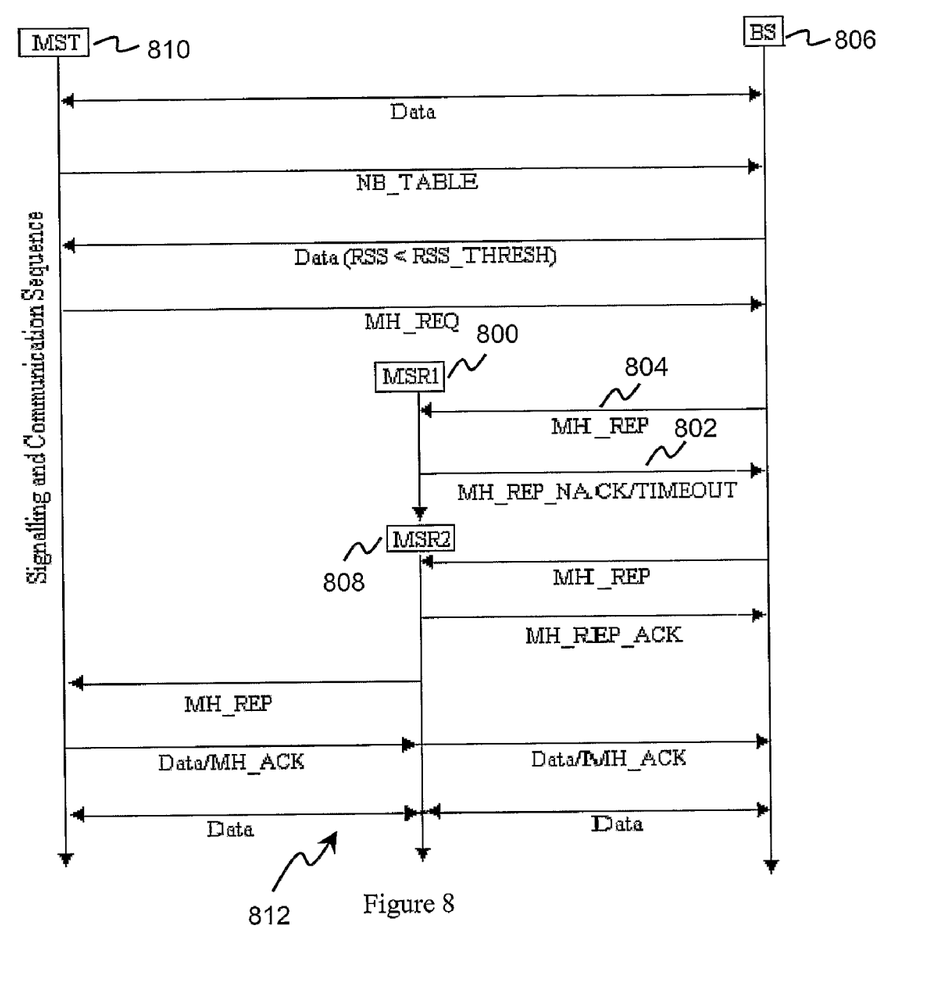
FIG. 8 illustrates signalling and Communication Sequence During Transition from SCN to MCN-MSR with the second best FoM is selected when the first selected MSR refuses to participate in the MCN configuration in accordance with an embodiment of the invention.

Turning now to FIG. 8, when the first selected relay node, MSR1 800, (with highest figure of merit) either: (a) fails to send an MH_REPLY_ACK within TIMEOUT seconds after the BS had sent a MH_REPLY message (compare FIG. 2), or (b) transmits a MH_REPLY_NACK rejection message (802) in response to MH_REPLY message 804, the BS 806 selects another relay node with second best figure of merit, MSR2 808. In this case, the BS 806 uses the ranked FoM array and selects the candidate MSR with MSR_ID index equates to MSR_ID_1 in table 5. The BS 806 can optionally execute this selection mechanism repeatedly if necessary until all entries in FoM array are exhausted.

An unused code in the downlink timeslot of the relay node is selected after the second stage of the relay node selection procedure and allocated to the MST for communication from the MST 810 to the MSR 808 wireless link 812 as shown.

The example embodiment utilises a multi-criterion relay node selection algorithm for multi-hop cellular networks. In the example embodiment, it is intended to execute this scheme within the Base Station (BS) element in the cellular communication system. The BS upon receiving a request from a MS, which requires multi-hop service, optimally selects an MS to act as the relaying MS from a pool of candidate MSs. The BS takes into account multiple criterion such as (a) the remaining battery power of the candidate MSs, (b) the data rate allocated to the candidate MSs, (c) the SNR of the received signal from the BS measured at candidate MSs, (d) the SNR of the received signal from candidate MSs measured at the MS requesting multi-hop service, and (e) transmission power of the signal from the BS to the candidate MSs. The relay node selection is divided into two stages and employs a heuristic-based technique. Use of heuristics reduces the complexity in selecting the relay node and a near optimal solution can be obtained in relatively small amount of time.

The first stage in the relay node selection process eliminates all candidate MSs which do not satisfy selected hard rules such as: (i) if the candidate MSR is already acting as relaying MS for another MS, (ii) if the BS could not allocate resources for the requesting MS to communicate with a particular candidate MSR and (iii) if the candidate MSR is already an MST and receiving service in a multi-hop fashion.

In the second stage a multi-criterion Figure of Merit (FoM) is calculated for all candidates MSs not eliminated at the end of the first stage. User-defined weights are associated with various criteria. The different candidate relay nodes are ranked, and the one with the maximum Figure of Merit is then selected as the relay node.

In the final step, the BS sends a reply message to the selected relaying MS. In the reply message, the BS may allocate additional physical resources to enable the communications between the relaying MS and MS requesting multi-hop service.

The relay node selection scheme of the example embodiment considers multiple criterion, with a two-stages candidate relay node evaluation process. The BS selects the relay node, instead of letting the MSs involved decide autonomously. This strategy allows the BS to maintain full knowledge of the radio resources assigned, thus achieving the desirable characteristics of system stability, load balancing, reduced inter and intra-cell interference and optimal utilization of radio resources.

In the example embodiment, the mobile stations in the network only report the neighboring MS whose signals are heard in the allocated downlink time-slot and not the entire TDMA frame. This means that only marginal additional battery power is expended by this scheme, since the RF circuitry remains idle during other (not allocated to the MS concerned) downlink time-slots.

The described example embodiment is simple to implement in the BS, as it does not require any complicated arithmetic or optimization algorithms. Moreover, it does not impose any additional requirements on the MSs beside the necessity to monitor and report neighboring MSs.

The underlying signaling scheme in the example embodiment is simple. There are no "Hello" messages exchanged among the MS nor do the MS exchange huge chunks of routing table data since the relay node selection is done at the BS, which has the complete knowledge of the cellular network under its coverage. This reduces the control message overhead in the proposed scheme. Furthermore, there is no flooding of route discovery messages, which also leads to a reduction in control message overhead.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of selecting a relay mobile station in a wireless communication network, the method comprising:
   applying an elimination process by a base station to candidate relay mobile stations, the elimination process comprising one or more Boolean decisions of a group consisting of (i) whether the candidate relay mobile station has already been chosen by the base station to serve as a relay station for another mobile station, (ii) whether the candidate relay mobile station is itself a mobile station requiring another relay mobile station to communicate with the base station, and (iii) whether an available code sequence cannot be allocated in a downlink time slot of the candidate relay mobile station;
   calculating a Figure of Merit (FoM) by the base station for each remaining candidate relay mobile station remaining after the elimination process based on one or more parameters; and
   selecting the relay mobile station from among the remaining candidate relay mobile stations based on the calculated FoMs.

2. The method as claimed in claim 1, further comprising: maintaining a table of the candidate relay mobile stations.

3. The method as claimed in claim 2, wherein the table comprises data on one or more of a group consisting of a code, a received signal strength (RSS), and a time of a last signal received from the candidate relay mobile station at a mobile station requesting the relay mobile station.

4. The method as claimed in claim 1, wherein the parameters comprise one or more of a group consisting of a remaining battery power of the candidate relay mobile station, a signal-to-noise ratio of a signal received at the candidate relay mobile station from a base station, a signal to noise ratio of a signal received from the candidate relay mobile station at a mobile station requesting the relay mobile station, a transmit power from the candidate relay mobile station to the base station, and a data rate allocated to the candidate relay mobile station for a downlink channel.

5. The method as claimed in claim 4, further comprising:
   maintaining a database containing data representing one or more of a group consisting of the remaining battery power of the candidate relay mobile station, the signal to noise ratio of a signal received at the candidate relay mobile station from a base station, the signal to noise ratio of the signal received from the candidate relay mobile station at the mobile station requesting the relay mobile station, the transmit power from the candidate relay mobile station to the base station, and the data rate allocated to the candidate relay mobile station for the downlink channel.

6. The method as claimed in claim 1, wherein calculating the FoMs comprises normalizing respective values of the parameters for the remaining candidate relay mobile stations.

7. The method as claimed in claim 1, further comprising:
   bypassing the calculating of the FoMs when the number of remaining candidate relay mobile stations is one.

8. The method as claimed in claim 1, further comprising:
   sending a message to the selected relay mobile station, and selecting another remaining candidate relay mobile stations based on the FoMs having next highest FoM value, if the relay mobile station selected first fails to send an acknowledgement message within a given time period or sends a rejection message.

9. A system for selecting a relay mobile station in a wireless communication network, the system comprising:
   means for applying an elimination processing to candidate relay mobile stations, the elimination processing including one or more Boolean decisions of a group consisting of (i) whether the candidate relay mobile station has already been chosen by the base station to serve as a relay station for another mobile station, (ii) whether the candidate relay mobile station is itself a mobile station requiring another relay mobile station to communicate with the base station, and (iii) whether an available code sequence cannot be allocated in a downlink time slot of the candidate relay mobile station;
   means for calculating a Figure of Merit (FoM) for each remaining candidate relay mobile station remaining after the elimination processing based on one or more parameters; and
   means for selecting the relay mobile station from the remaining candidate relay mobile stations based on the calculated FoMs.

10. The system as claimed in claim 9, further comprising:
    a database for maintaining a table of the candidate relay mobile stations.

11. The system as claimed in claim 10, wherein the table comprises data on one or more of a group including a code, a received signal strength (RSS), and a time of a last signal received from the candidate relay mobile station by a mobile station requesting the relay mobile station.

12. The system as claimed in claim 10, wherein the database is located at a base station of the wireless communications network.

13. The system as claimed in claim 9, wherein the parameters comprise one or more of a group consisting of a remaining battery power of the candidate relay mobile station, a signal to noise ratio of a signal received at the candidate relay mobile station from a base station, a signal to noise ratio of a signal received from the candidate relay mobile station at a mobile station requesting the relay mobile station, a transmit power from the candidate relay mobile station to the base station, and a data rate allocated to the candidate relay mobile station for a downlink channel.

14. The system as claimed in claim 13, further comprising:
a second database that contains data representing one or more of a group including the remaining battery power of the candidate relay mobile station, the signal to noise ratio of a signal received at the candidate relay mobile station from a base station, the signal to noise ratio of the signal received from the candidate relay mobile station at the mobile station requesting the relay mobile station, the transmit power from the candidate relay mobile station to the base station, and the data rate allocated to the candidate relay mobile station for the downlink channel.

15. The system as claimed in claim 14, wherein the second database is located at a base station of the wireless communications network.

16. The system as claimed in claim 9, wherein the means for applying the elimination processing, in calculating the FoMs, normalizes respective values of the parameters for the remaining candidate relay mobile stations.

17. The system as claimed in claim 9, wherein the means for applying the elimination processing bypasses the calculating the FoMs when the number of remaining candidate relay mobile stations is one.

18. The system as claimed in claim 9, further comprising:
means for sending a message to the selected relay mobile station, and the means for selecting selects another one of the remaining candidate relay mobile stations based on the FoMs, if the selected relay mobile station, within a given time period, fails to send an acknowledgement message or sends a rejection message to a receiver means of the system.

19. The system as claimed in claim 9, wherein the means for applying the elimination processing are located at a base station of the wireless communications network.

20. The system as claimed in claim 9, wherein the wireless communications network is based on TDD-CDMA multiple access technology.

* * * * *